US007043209B2

(12) United States Patent
Hirota

(10) Patent No.: US 7,043,209 B2
(45) Date of Patent: May 9, 2006

(54) ELECTRONIC DEVICE AND METHOD OF MOUNTING RADIO ANTENNA

(75) Inventor: Toshiyuki Hirota, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 491 days.

(21) Appl. No.: 10/199,327

(22) Filed: Jul. 22, 2002

(65) Prior Publication Data

US 2003/0022637 A1    Jan. 30, 2003

(30) Foreign Application Priority Data

Jul. 26, 2001   (JP)  ............................. 2001-225285

(51) Int. Cl.
*H04B 1/02*   (2006.01)
(52) U.S. Cl. ................ 455/101; 455/556.2; 455/575.7; 343/725; 343/893
(58) Field of Classification Search ............... 455/101, 455/95, 556.1, 556.2, 557, 269, 272, 344, 455/73, 74, 74.1, 550.1; 343/700, 846, 893, 343/720, 725

See application file for complete search history.

(56) References Cited

U.S. PATENT DOCUMENTS

| 5,955,968 | A | * | 9/1999 | Bentrott et al. | ............. 340/906 |
| 6,426,723 | B1 | * | 7/2002 | Smith et al. | ......... 343/700 MS |
| 6,862,433 | B1 | * | 3/2005 | Callaway, Jr. | ............. 455/101 |
| 2002/0164963 | A1 | * | 11/2002 | Tehrani et al. | ............. 455/101 |

FOREIGN PATENT DOCUMENTS

| JP | 05-259725 | 10/1993 |
| JP | 11-186945 | 7/1999 |
| TW | 447169 | 7/2001 |

OTHER PUBLICATIONS

Notice of Decision of Rejection from the Taiwan Patent Office, 3 pages, with English translation (4 pages).

* cited by examiner

*Primary Examiner*—Edward Urban
*Assistant Examiner*—Thuan T. Nguyen
(74) *Attorney, Agent, or Firm*—Finnegan, Henderson, Farabow, Garreyy & Dunner, L.L.P.

(57) ABSTRACT

An electronic device comprises first and second antennas for a first radio communication scheme that uses a diversity scheme, and a third antenna for a second radio communication scheme arranged between the first and second antennas.

7 Claims, 3 Drawing Sheets

ELECTRONIC DEVICE AND METHOD OF MOUNTING RADIO ANTENNA

CROSS-REFERENCE TO RELATED APPLICATIONS

This application is based upon and claims the benefit of priority from the prior Japanese Patent Application No. 2001-225285, filed Jul. 26, 2001, the entire contents of which are incorporated herein by reference.

BACKGROUND OF THE INVENTION

1. Field of the Invention

The present invention relates to an electronic device capable of making radio communication and a method of mounting an antenna to an electronic device.

2. Description of the Related Art

In recent network environments such as workplaces, wireless LANs become popular as the form of a network in place of the conventional wire LANs. Other than the wireless LANs, devices for making radio communication to transmit/receive data increase instead of a conventional device connection using wires.

A radio communication module is built into a notebook type personal computer to perform signal modulation/demodulation processing for radio communication. This module receives transmission data from a CPU or memory that is built into the personal computer and performs the signal modulation processing of the transmission data in accordance with a predetermined format. The module then transmits the resultant modulated data to an antenna serving as a radio communication interface, thereby transmitting data. The module receives a radio wave via the antenna, performs a predetermined demodulation processing for the received data, and transfers the resultant demodulated data to the CPU or memory.

To increase the transmission/reception sensitivity of a signal, the antenna is desirably arranged at the highest position. In the notebook type personal computer, the antenna has been arranged at a display unit including an LCD panel. To further improve a reception efficiency, a device for performing diversity reception is also available.

As such a device performing diversity reception, a portable radio information terminal capable of performing diversity reception is disclosed in Japanese Patent Application KOKAI Publication No. 11-186945. This discloses a technique that enables diversity reception applied to a single radio communication method to be performed by using two antennas having different characteristics.

Various types of radio communication schemes, e.g., IEEE 802.11b represented by a wireless LAN, Bluetooth (Registered Trademark) serving as a short-distance wireless communication standard, Home RF for realizing simple home radio environment, and the like are proposed in recent years. A single electronic device that copes with these plurality of radio communication schemes will pervade in the future.

Since, however, portable small-size electronic devices such as a notebook type personal computer and PDA (Personal Digital Assistants) are made more compact and thin and improved in mounting density, a space for mounting antennas is limited.

An electronic device that includes and uses a plurality of radio communication schemes must include antennas the types of which are equal in number to these communication schemes.

In particular, when diversity antennas are used in one radio communication scheme, two antennas achieving the diversity reception need to be arranged to have a gap equal to or larger than a predetermined distance. This requires a large mounting area. In addition, when an antenna used in another communication scheme is to be mounted, it is difficult to ensure a space for mounting the antenna.

BRIEF SUMMARY OF THE INVENTION

The present invention is directed to provide an electronic device in which an antenna is effectively arranged in a limited space in the electronic device.

The present invention is directed to provide a method of mounting an antenna in which the antenna is effectively arranged in a limited space in an electronic device.

According to an embodiment of the present invention, an electronic device comprises first and second antennas for a first radio communication scheme which uses a diversity scheme; and a third antenna for a second radio communication scheme arranged between the first and second antennas.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of an electronic device according to the present invention will now be described with reference to the accompanying drawings. A personal computer is used as an example of the electronic device.

First Embodiment

Figure 1:
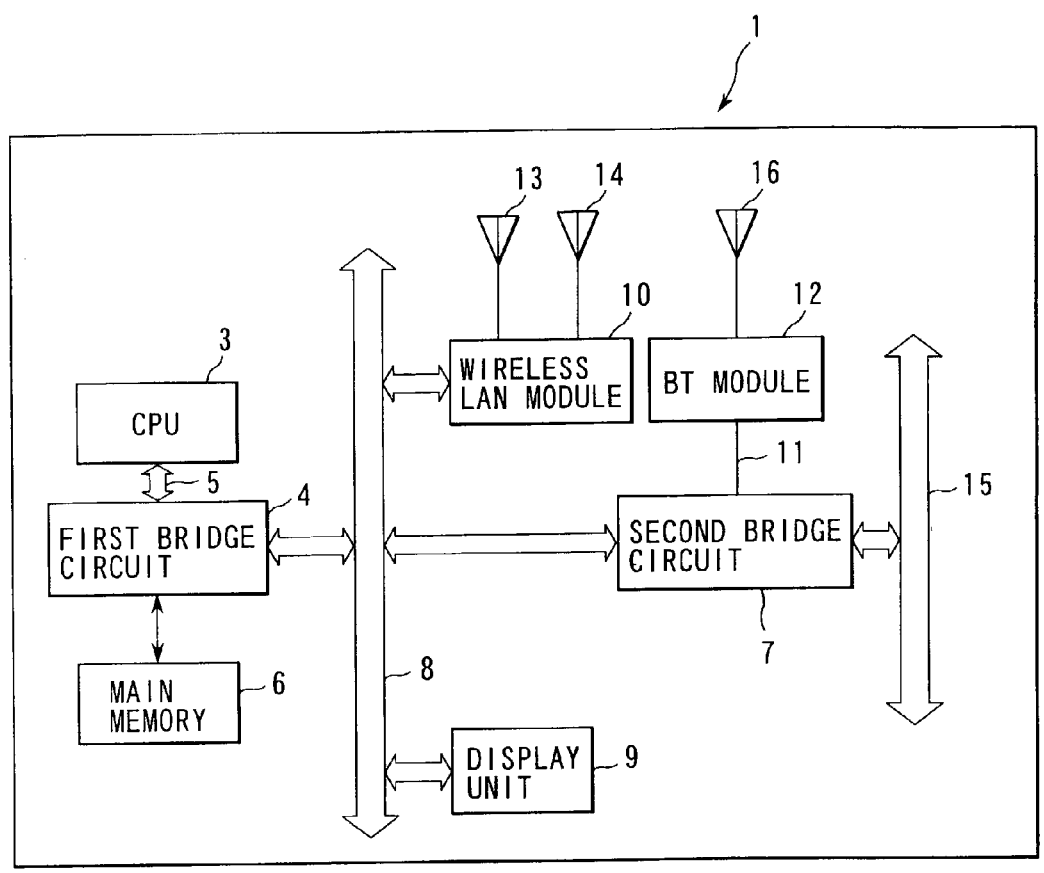
FIG. 1 is a block diagram of a personal computer according to the first embodiment of the present invention.

FIG. 1 shows the hardware arrangement of a personal computer according to the first embodiment of the present invention.

A personal computer 1 is an electronic device capable of making radio communications based on IEEE 802.11b and Bluetooth.

Radio communication based on IEEE 802.11b is one of radio communication standards that uses a 2.4 GHz ISM (Industry Science Medical) band. In IEEE 802.11b, a direct sequence spread spectrum (DSSS) is used as a spread spectrum scheme, and communication can be made at a communication speed of 11 Mbps at maximum.

Bluetooth is a short-distance wireless communication standard that realizes radio communication within 10 meters or less (maximum of 100 meters) using the 2.4 GHz ISM band. In Bluetooth, a frequency hopping spread spectrum (FHSS) is used as a spread spectrum scheme, and a maximum of 8 devices can be connected as one group (Piconet) by time-division multiplexing at a communication speed of 1 Mbps at maximum.

In the personal computer 1, a CPU 3 and first bridge (north bridge) circuit 4 are connected to each other via a CPU local bus 5 having a data bus with a 64-bit width, and the first bridge circuit 4 is connected to a main memory 6 via a memory bus. The first bridge circuit 4 is connected to a second bridge (south bridge) circuit 7 via a high-speed bus 8 having a data bus with a 32-bit width. The high-speed bus 8 is connected to a display unit 9 for displaying various types of information, and a wireless LAN module 10 for performing modulation/demodulation processing of a radio signal complying with IEEE 802.11b. The second bridge circuit 7 is connected to a Bluetooth module 12 for performing modulation/demodulation processing of a radio signal complying with Bluetooth via a USB (Universal Serial Bus) 11.

The CPU 3 executes operation control and data processing for the entire personal computer.

The main memory 6 is a memory device which stores an operating system, a device driver, an application program to be executed, and processing data, and is formed of a plurality of DRAMs and the like.

The first bridge circuit 4 is a bridge LSI connecting the CPU local bus 5 and high-speed bus 8, and functions as one of bus master devices of the high-speed bus 8. The first bridge circuit 4 has a function of converting a bus width including data and an address between the CPU local bus 5 and high-speed bus 8, and a function of controlling access to the main memory 6 via the memory bus.

The high-speed bus 8 is a clocked I/O bus. All cycles on the high-speed bus 8 are synchronized with high-speed bus clocks. The high-speed bus 8 has an address/data bus used by time division.

The high-speed bus 8 is connected to the wireless LAN module 10. The wireless LAN module 10 executes signal modulation/demodulation processing of radio data complying with IEEE 802.11b, and copes with a diversity scheme. Diversity antennas 13 and 14 each of which serves as an interface for radio signal transmission/reception are connected to the wireless LAN module 10 via coaxial cables.

In the diversity scheme, one antenna is an antenna (main antenna) used for transmission and reception, and the other antenna is an antenna (sub-antenna) used for only reception. The main antenna is generally used in data transmission, and in data reception, one of the main antenna and sub-antenna that has a reception level higher than that of the other is selectively used to minimize level variations in a received radio wave. In this embodiment, the diversity antenna 13 is used as the main antenna and the diversity antenna 14 is used as the sub-antenna, and vice versa.

The second bridge circuit 7 is a bridge LSI connecting the high-speed bus 8 and a low-speed bus 15, and performs bus conversion between the high-speed bus 8 and low-speed bus 15. The second bridge circuit 7 has a USB controller for controlling serial data transmission, which controls signal transmission/reception between the second bridge circuit 7 and Bluetooth module 12 connected to each other via the USB 11.

The Bluetooth module 12 executes data modulation/demodulation complying with the Bluetooth communication scheme, frequency hopping spread spectrum control, and the like. An antenna 16 serving as an interface for radio signal transmission/reception is connected to the Bluetooth module 12 via a coaxial cable.

With the aforementioned scheme arrangement, radio communication complying with Bluetooth or IEEE 802.11b can be made with external radio communication devices. In this embodiment, inverted-F antennas are used as the diversity antennas 13 and 14 and the antenna 16. The inverted-F antenna is an antenna using the resonance of a metal plate that is used for a top plate, and this antenna is called the inverted-F antenna because it has an inverted F shape.

Figure 2:
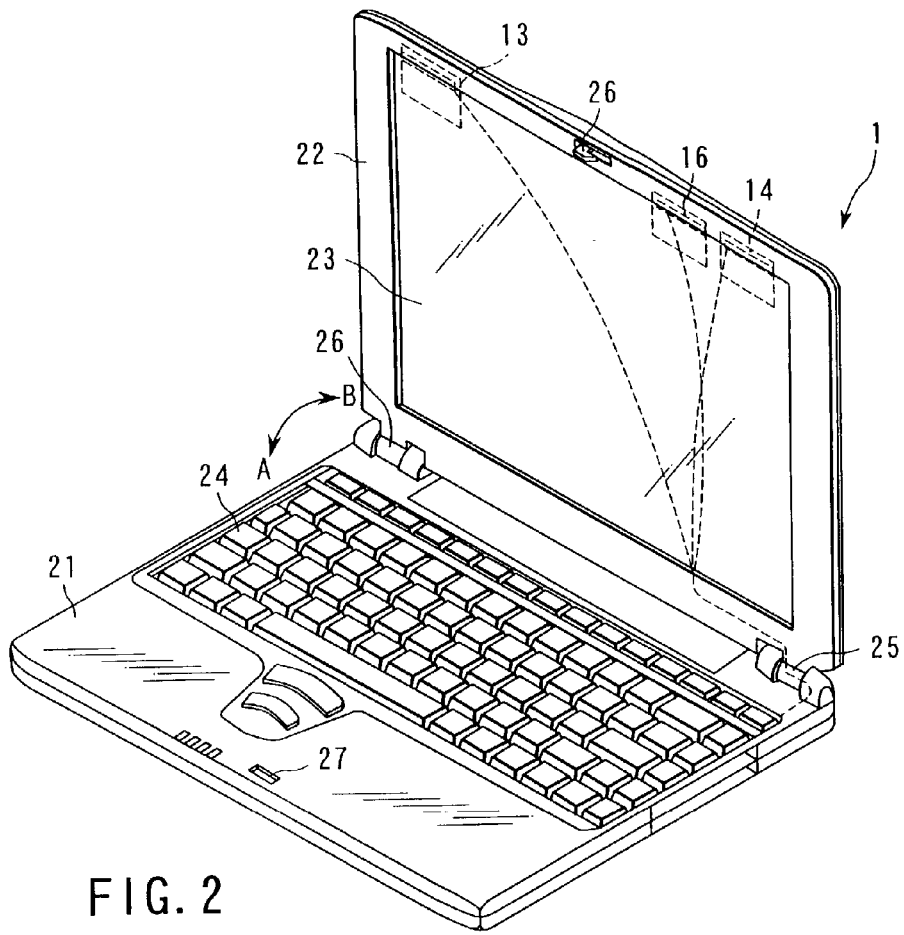
FIG. 2 is a perspective view showing the outer appearance of the personal computer in the first embodiment.

FIG. 2 is a perspective view showing the outer appearance of the personal computer 1 described above.

The personal computer 1 has a main body case 21, display case 22, LCD panel 23, and keyboard 24. The keyboard 24 is arranged at the upper surface portion of the main body case 21. The main body case 21 and display case 22 are pivotally connected by hinge sections 25. The display case 22 supports the peripheral portions of the LCD panel 23 so as to make the display region of the LCD panel 23 visible. The display case 22 is movable in the direction of an arrow A-B through the hinge sections 25 and between a closed position at which the display case 22 covers the keyboard 24 and an open position at which the keyboard 24 can be used.

When the display case 22 is moved in the direction of the arrow A, a latch 26 is engaged with an engaging hole 27 formed in the main body case 21 to lock the main body case 21 and display case 22.

The diversity antennas 13 and 14 used in the wireless LAN (IEEE 802.11) and the antenna 16 used in Bluetooth are arranged at an upper side portion of the display case 22 that supports the LCD panel 23.

To increase the reception sensitivity, a radio antenna is ideally arranged at a high position. In consideration of the situation in which the personal computer 1 is used, the diversity antennas 13 and 14 and the antenna 16 are arranged at the upper side portion of the display case 22 where it is a high position in use (in an open position shown in FIG. 2).

Each antenna leads in the main body case 21 through the back surface of the LCD panel 23 and the hinge section 25 by using the coaxial cable (indicated by the dot lines in FIG. 2). The diversity antennas 13 and 14 and the antenna 16 are respectively connected to the wireless LAN module 10 and the Bluetooth module 12 formed on the circuit board (not shown) in the main body case 21.

Figure 3:
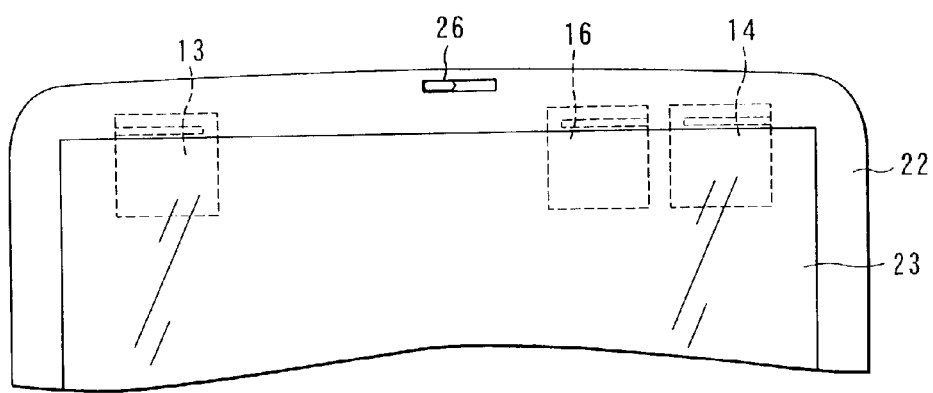
FIG. 3 is a view showing the mounting positions of antennas in the first embodiment.

FIG. 3 is an enlarged view of the upper portion of the display case 22 of the personal computer 1 shown in FIG. 2.

The two diversity antennas 13 and 14 used for the diversity scheme are generally spaced apart from each other by 3λ/4 (λ: wavelength) or more. In this embodiment, the diversity antennas 13 and 14 are arranged to have a distance of 3λ/4 or more.

If an antenna is arranged near a conductor such as the latch 26 or an incorporated screw, the frequency characteristics of the antenna vary. To solve this, the diversity antennas 13 and 14 are arranged to be spaced apart from each other by 3λ/4 or more and apart from the conductor. In this embodiment, the diversity antennas 13 and 14 are arranged to have a distance of 12 cm.

The antenna 16 used in the Bluetooth scheme is arranged between the diversity antennas 13 and 14. The single antenna 16 is arranged near the sub-antenna 14. The diversity antenna 13 serves as the main antenna, and a high-level transmission radio wave from it may be received by the antenna 16 if it is arranged near the main antenna 13. Thus, the antenna 16 is preferably arranged near the sub-antenna 14. The antenna 16 is naturally arranged at a position where the conductor affects the antenna little.

In this fashion, the antenna used in the other communication scheme is arranged between the diversity antennas 13 and 14, so that a plurality of antennas correspond to the plurality of communication schemes can be mounted in only a space between the two antennas used in the diversity scheme. This can reduce the mounting space of the antennas. If the three types of antennas are mounted, two single antennas respectively used in two other radio communication schemes may be arranged between two antennas used in the diversity scheme.

As described above, according to the first embodiment, the electronic device having the display unit uses diversity antennas in one radio communication scheme. The antennas for achieving the diversity are arranged in the display unit, and an antenna used in another communication scheme is arranged between these diversity antennas. With this structure, only if an arrangement space for the two diversity antennas can be ensured, the antenna for the other communication scheme can also be mounted. Therefore, the antenna mounting area can be reduced in the electronic device having high-density mounting space.

In the first embodiment, the diversity antennas are used for the wireless LAN and the single antenna is used for Bluetooth. However, the diversity antennas may be used for Bluetooth and the single antenna may be used for the wireless LAN.

Another embodiment of the present invention will be described next. In the following embodiment, the same reference numerals corresponding to those in the first embodiment denote the same part, and a detailed description thereof will be omitted.

Second Embodiment

Diversity antennas are also used for the Bluetooth scheme in the second embodiment.

Figure 4:
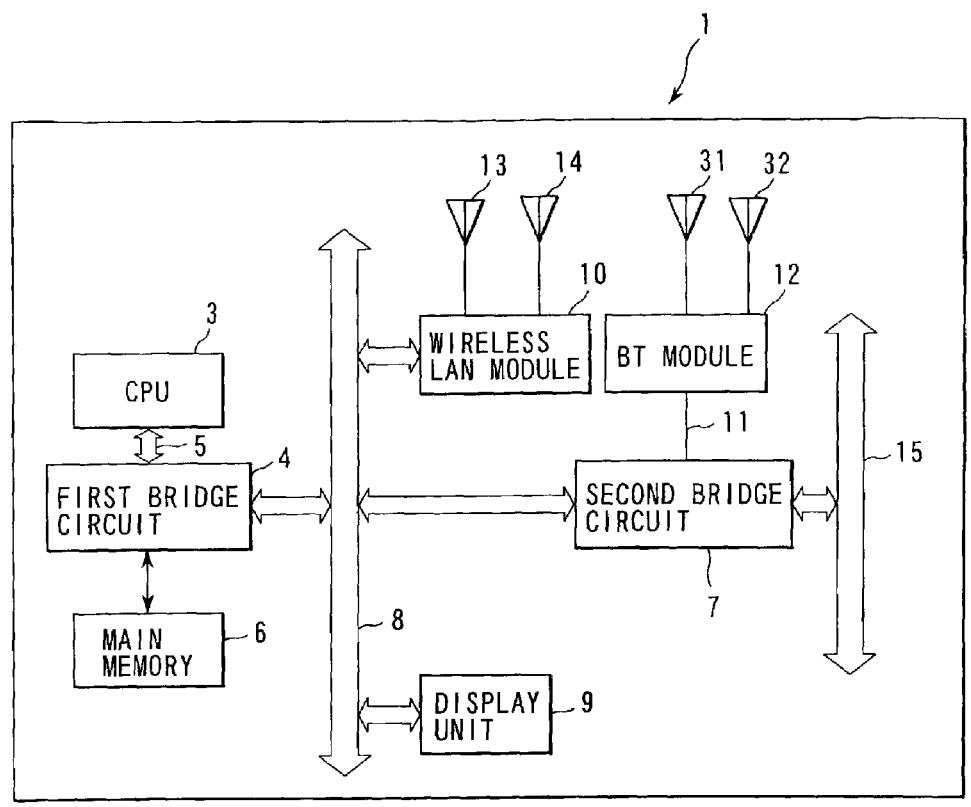
FIG. 4 is a block diagram of a personal computer according to the second embodiment of the present invention.

FIG. 4 shows a hardware arrangement of a personal computer according to the second embodiment of the present invention.

In the second embodiment, diversity antennas are also used for the Bluetooth scheme. Instead of the Bluetooth antenna 16 in the first embodiment, Bluetooth diversity antennas 31 and 32 are connected to the Bluetooth module 12 via the coaxial cables. In the diversity scheme, only one antenna is generally used in data transmission, and in data reception, one of the diversity antennas 31 and 32 which has a reception level higher than that of the other is selectively used to minimize level variations in received radio wave. In the second embodiment, the diversity antenna 31 is used as a main antenna and the diversity antenna 32 is used as a sub-antenna.

Figure 5:
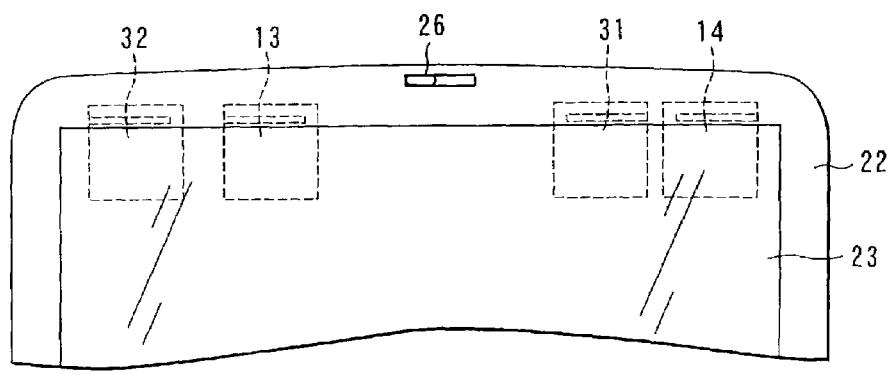
FIG. 5 is a view showing the mounting positions of antennas in the second embodiment.

FIG. 5 is an enlarged view of the upper portion of the display case 22 when two pairs of diversity antennas are arranged.

As shown in FIG. 5, the Bluetooth diversity main antenna 31 is arranged between wireless LAN diversity antennas 13 and 14, and the Bluetooth diversity sub antenna 32 is arranged such that the wireless LAN diversity main antenna 13 is arranged between the Bluetooth diversity antennas 31 and 32.

When the two pairs of diversity antennas are to be arranged, the main antennas 13 and 31 used in the respective schemes are arranged to be apart from each other. If an antenna is arranged near a conductor such as the latch 26 or incorporated screw, the frequency characteristics of the antenna vary. To solve this, the diversity antennas in a pair are arranged to be spaced apart from each other by 3λ/4 or more and apart from the conductor.

As described above, according to the second embodiment, even when the two pairs of diversity antennas are arranged, the antenna mounting area in the personal computer can be reduced by arranging, between two diversity antennas in one radio scheme, at least one, preferably the main antenna, of the two diversity antennas in the other radio scheme.

The two diversity antennas used in the other radio communication scheme may be arranged between the two diversity antennas in one radio communication scheme. This is particularly effective when radio communication schemes with the different wavelengths are used.

The wireless LAN and Bluetooth are also exemplified in the second embodiment, but other radio communication schemes may be used.

As has been described above, in the electronic device according to the present embodiments which can use a plurality of radio communication schemes, when a plurality of antennas correspond to the plurality of communication schemes are mounted, the antenna mounting area are reduced.

The wireless LAN and Bluetooth are exemplified in these embodiments described above, but various radio communication schemes can be applied to the present invention. For the antennas, any kind of antenna other than the inverted-F antenna can be used, and the different kinds of antennas can be used together.

The present invention is not limited to the embodiments described above and can be applied to a PDA or a portable radio device without departing from the spirit and scope thereof.

According to the present invention described in detail above, when the electronic device which can use two or more types of the radio communication schemes uses the diversity antennas in at least one radio communication scheme, it is possible to reduce an antenna mounting area by arranging an antenna used in other radio communication schemes between these two diversity antennas.

What is claimed is:

1. An electronic device comprising:
   a body; and
   a display unit connected to the body, the display unit comprising:
      first and second antennas for a first radio communication scheme which uses a diversity scheme provided at an upper portion of the display unit; and
      a third antenna for a second radio communication scheme provided between the first and second antennas, the third antenna being arranged at a position close to the second antenna than the first antenna,
      wherein the first antenna includes a transmission/reception antenna and the second antenna includes a reception antenna.

2. The electronic device according to claim 1, wherein the body includes a keyboard, and the display unit is attached to the body to be movable between a closed position at which the display unit covers the keyboard and an open position at which the keyboard is exposed.

3. The electronic device according to claim 2, wherein the body comprises a first transmission/reception circuit connected to the first antenna and second antennas and a second transmission/reception circuit connected to the third antenna.

4. An electronic device comprising:
   a body; and
   a display unit connected to the body, the display unit comprising:

first and second antennas for a first radio communication scheme which uses a diversity scheme, the first and second antennas provided at an upper portion of the display unit;
a third antenna for a second radio communication scheme arranged between the first and second antennas; and
a fourth antenna for the second radio communication scheme connected to the second communication module and provided at the upper portion of the display unit,
wherein the second radio communication scheme uses a diversity scheme, the first antenna includes a transmission/reception antenna, the second antenna includes a reception antenna, the third antenna includes a transmission/reception antenna, and the fourth antenna includes a reception antenna.

5. The electronic device according to claim 4, wherein the first antenna is arranged between the third and fourth antennas.

6. The device according to claim 4, wherein the body includes a keyboard, and the display unit is attached to the body to be movable between a closed position at which the display unit covers the keyboard and an open position at which the keyboard is exposed.

7. The electronic device according to claim 4, wherein the body comprises a first transmission/reception circuit connected to the first and second antennas and a second transmission/reception circuit connected to the third and fourth antennas.

* * * * *

UNITED STATES PATENT AND TRADEMARK OFFICE
CERTIFICATE OF CORRECTION

PATENT NO. : 7,043,209 B2
APPLICATION NO. : 10/199327
DATED : May 9, 2006
INVENTOR(S) : Hirota It is certified that error appears in the above-identified patent and that said Letters Patent is hereby corrected as shown below:

On Title Page  Col. 1, item (74), line 2, change "Garreyy" to --Garrett--.

Claim 1, column 6, line 49, change "close" to --closer--.

Claim 3, column 6, line 61, change "first antenna and second" to --first and second--.

Signed and Sealed this

Fifteenth Day of August, 2006

JON W. DUDAS
*Director of the United States Patent and Trademark Office*